United States Patent [19]

Sakoe

[11] Patent Number: 4,975,961

[45] Date of Patent: Dec. 4, 1990

[54] MULTI-LAYER NEURAL NETWORK TO WHICH DYNAMIC PROGRAMMING TECHNIQUES ARE APPLICABLE

[75] Inventor: Hiroaki Sakoe, Tokyo, Japan

[73] Assignee: NEC Corporation, Tokyo, Japan

[21] Appl. No.: 263,208

[22] Filed: Oct. 27, 1988

[30] Foreign Application Priority Data

Oct. 28, 1987 [JP] Japan .................. 62-273833
Oct. 30, 1987 [JP] Japan .................. 62-276398

[51] Int. Cl.$^5$ ............................................. G10L 7/08
[52] U.S. Cl. .................................................... 381/43
[58] Field of Search ................................... 381/41–45;
364/513, 513.5, 200 MS File, 900 MS File;
382/14–15; 307/201

[56] References Cited

U.S. PATENT DOCUMENTS

| | | | |
|---|---|---|---|
| 3,287,649 | 11/1966 | Rosenblatt | 381/43 |
| 4,752,906 | 6/1988 | Kleinfeld | 364/807 |
| 4,760,604 | 7/1988 | Cooper et al. | 382/15 |
| 4,773,024 | 9/1988 | Faggin et al. | 364/513 |
| 4,774,677 | 9/1988 | Buckley | 364/513 |
| 4,805,225 | 2/1989 | Clark | 382/15 |
| 4,807,168 | 2/1989 | Moopenn et al. | 307/201 |

OTHER PUBLICATIONS

Lippmann, "An Introduction to Computing with Neural Nets", IEEE ASSP Magazine, vol. 4, No. 2, 4/87, pp. 4–22.

*Primary Examiner*—Dale M. Shaw
*Assistant Examiner*—John A. Merecki
*Attorney, Agent, or Firm*—Sughrue, Mion, Zinn, Macpeak & Seas

[57] ABSTRACT

In a neural network, input neuron units of an input layer are grouped into first through J-th input layer frames, where J represents a predetermined natural number. Intermediate neuron units of an intermediate layer are grouped into first through J-th intermediate layer frames. An output layer comprises an output neuron unit. Each intermediate neuron unit of a j-th intermediate layer frame is connected to the input neuron units of j'-th input layer frames, where j is variable between 1 and J and j' represents at least two consecutive integers, one of which is equal to j and at least one other of which is less than j. Each output neuron unit is connected to the intermediate neuron units of the intermediate layer. For recognition of an input pattern represented by a time sequence of feature vectors, each consisting of K vector components, where K represents a predetermined positive integer, each input layer frame consists of K input neuron units. Each intermediate layer frame consists of M intermediate neuron units, where M represents a positive integer which is less than K. The vector components of each feature vector are supplied to the respective input neuron units of one of the input layer frames that is preferably selected from three consecutively numbered input layer frames. The neural network is readily trained to make a predetermined one of the output neuron units produce an output signal indicative of the input pattern and can be implemented by a microprocessor.

4 Claims, 3 Drawing Sheets

MULTI-LAYER NEURAL NETWORK TO WHICH DYNAMIC PROGRAMMING TECHNIQUES ARE APPLICABLE

BACKGROUND OF THE INVENTION

This invention relates to a multi-layer neural network or net.

Neural networks of various types are described in an article contributed by Richard P. Lippmann to the IEEE ASSP Magazine, April 1987, pages 4 to 22, under the title of "An Introduction to Computing with Neural Nets". Lippmann refers to applicability of the neural networks to speech and pattern recognition. The multi-layer neural network is described in the Lippmann article, pages 15 to 18, as well as a back-propagation training algorithm therefor. Such a multi-layer neural network will hereafter be referred to simply as a neural network.

It is described by Lippmann that the neural network comprises at least three layers, such as an input layer, an intermediate or hidden layer, and an output layer. The input layer comprises a plurality of input neuron units. The intermediate layer comprises a plurality of intermediate neuron units, which may be greater in number than the input neuron units. The output layer comprises at least one output neuron unit. The neuron unit is alternatively called either a computational element or a node.

In the manner which will later be exemplified with reference to one of the accompanying drawing figures, the input neuron units are not connected to one another. The intermediate neuron units are neither connected to one another. It is general that the intermediate neuron units are connected to the input neuron units in various manners through input to intermediate connections. Each output neuron unit is connected to predetermined ones of the intermediate neuron units through intermediate to output connections.

On recognizing an input pattern represented by an input pattern time sequence known in the art of pattern recognition, input signal components of the input pattern time sequence are delivered to predetermined ones of the input neuron units. The output neuron units are preliminarily assigned to predetermined patterns, respectively. The predetermined patterns are preselected so that one of the predetermined patterns gives a correct result of recognition of the input pattern.

Each input signal component is forwardly propagated or conveyed from the input layer to the intermediate layer and thence to the output layer. A weighting coefficient or factor is attributed to each of the input to intermediate and the intermediate to output connections. It is therefore possible to understand that each of the intermediate and the output neuron units has a weighting coefficient which should be multiplied on a signal component supplied thereto. Such weighting coefficients and others will be referred to by using the words "intermediate" and "output" or "output layer" as modifiers when related to the intermediate and the output layers.

When some of the input signal components are supplied from pertinent ones of the input neuron units to one of the intermediate neuron units as intermediate input components, the intermediate neuron unit calculates an intermediate weighted sum of the intermediate input components in accordance with the intermediate weighting coefficients for the respective intermediate input components and then nonlinearly transforms the weighted sum into an intermediate output component. Supplied with such intermediate output components from relevent ones of the intermediate neuron units as output layer input components, each output neuron unit similarly calculates an output weighted sum according to the output weighting coefficients for the respective output layer input components and nonlinearly transforms the output weighted sum into an output signal component.

In this manner, the neural network produces the output signal components from the respective output neuron units collectively as an output signal when supplied with the input pattern time sequence. The output signal components have different intensities which depend primarily on the input pattern time sequence and the intermediate and the output weighting coefficients. One of the output neuron units produces its output signal component with a maximum intensity so that the output signal comprises the output signal component of the maximum intensity as a sole significant component. After the neural network is trained in compliance with the back-propagation training algorithm, the significant component is produced from one of the output neuron units that is assigned to the correct result of recognition of the input pattern.

In such a manner, the output signal components represent degrees of likelihood or matching between a certain one of the predetermined patterns and a pattern which is represented by the input pattern time sequence as the input pattern. In other words, the neural network is operable as a pattern matching device when used in pattern recognition. On the other hand, it is known that dynamic programming techniques or algorithms are effective in pattern recognition.

It is expected that a neural network gives a solution, by its capability of learning or being trained, to pattern matching which seems very difficult to theoretically solve. Attention is directed by the present inventor to the fact that the input and the intermediate neuron units are flexibly interconnected in a conventional neural network and that this is not desirable in making the neural network deal with a specific problem. More particularly, the dynamic programming techniques are not readily applicable to the conventional neural network. Moreover, it takes long time to train a conventional neural network so as to reliably recognize an input speech pattern.

SUMMARY OF THE INVENTION:

It is therefore a general object of the present invention to provide a neural network, to which dynamic programming techniques are readily applicable.

It is another general object of this invention to provide a neural network of the type described, which is effectively applicable to speech recognition.

It is a specific object of this invention to provide a neural network of the type described, which can be readily trained so as to reliably recognize connected words.

Other objects of this invention will become clear as the description proceeds.

According to Applicants invention, a neural network includes an input layer of input neuron units grouped into first through J-th input layer frames, where J represents a predetermined natural number, an intermediate layer of intermediate neuron units grouped into first through J-th intermediate layer frames and an output layer comprising an output neuron unit. Input-intermediate connections are provided for connecting each intermediate neuron unit of a j-th intermediate layer frame to the input neuron units of at least two consecutive input layer frames, beginning at the j-th input layer frame and proceeding in descending order in the direction j-l. However, when j-l is not a positive integer, then there is no connection from the intermediate neuron units of the j-th intermediate layer frame to an input neuron unit.

Figure 1:
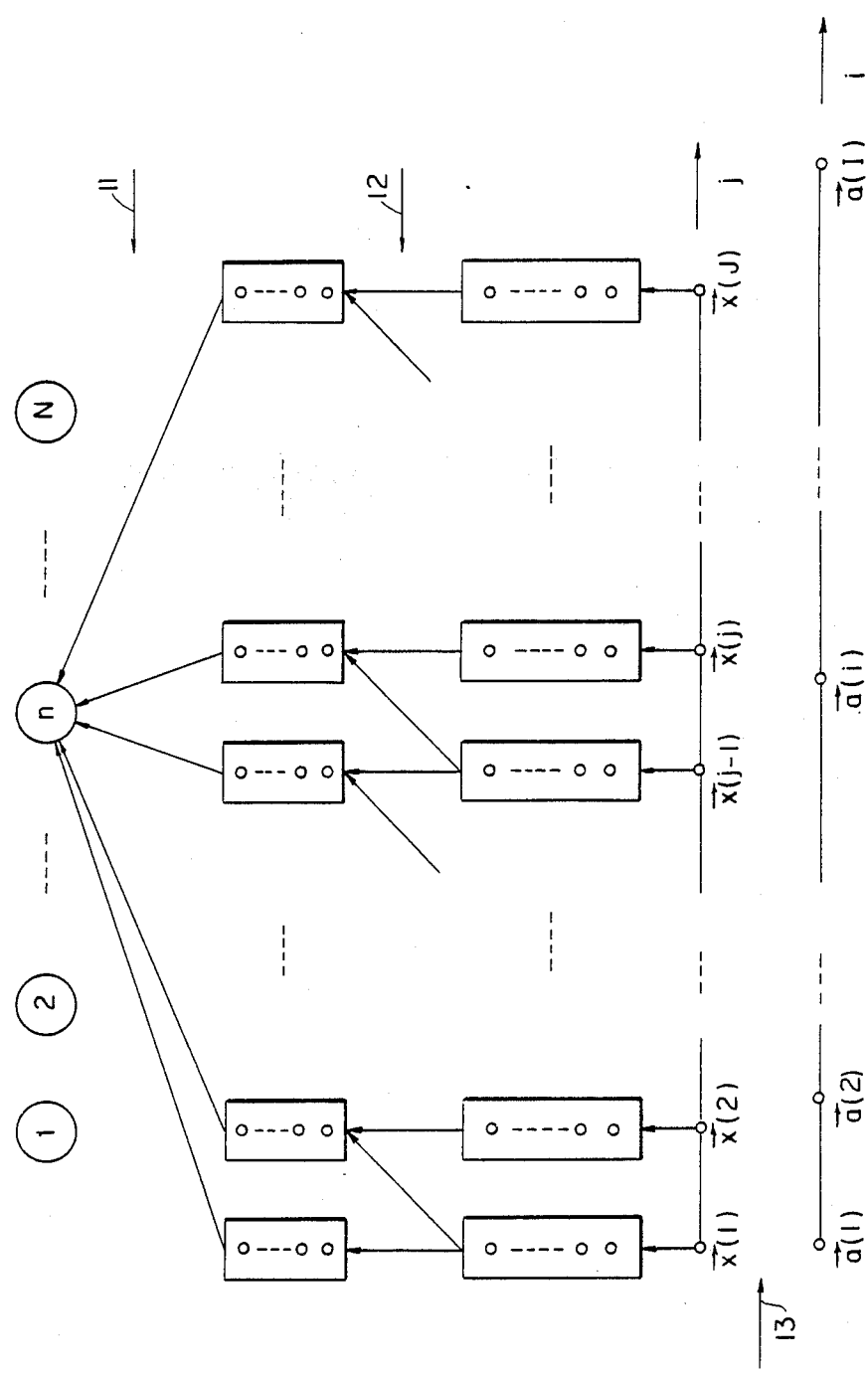
FIG. 1 is a schematic illustration of a neural network according to a first embodiment of the instant invention.

DESCRIPTION OF THE PREFERRED EMBODIMENTS:

Referring to FIG. 1, a neural network or net comprises three layers in accordance with a first embodiment of the present invention. The neural network is for use in recognizing an input speech pattern represented by an input pattern time sequence of first, second, ..., i-th, ..., and I-th K-dimensional feature vectors which are positioned at first through I-th pattern time instants, respectively, along an input pattern time axis i shown at the bottom of the figure and will be described more in detail later in the following.

In connection with the input pattern time sequence, I represents a first natural number which depends on the length or duration of the input speech pattern and is called an input pattern length. It is known in the art of speech recognition that K represents a first predetermined integer which is typically equal to about ten. The pattern time instants are equally spaced apart from one another at a sampling period used in extracting the feature vectors from the input speech pattern.

In the known manner, the input pattern time sequence is mapped or warped into an input signal time sequence which is illustrated above the input pattern time sequence along an input signal time axis j and comprises first, second, ..., j-th, ..., and J-th K-dimensional signal vectors positioned at first through J-th signal time instants spaced apart by a predetermined time interval, such as ten milliseconds. As regards the input signal time sequence, J represents a second natural number which is related to the first natural number I in compliance with a mapping or warping function used in mapping the input pattern time sequence to the input signal time sequence.

One of the three layers is an input layer which is depicted as if directly connected to the input signal time sequence merely on account of the reason which will become clear as the description proceeds. The input layer comprises a plurality of input neuron units which are symbolically illustrated by small circles. In the manner described heretobefore, the input neuron units are not connected to one another.

It should be noted in FIG. 1 that the input neuron units are grouped into first, second, ..., j-th, ..., and J-th input layer frames in correspondence to the respective signal time instants. Each input layer frame is represented by a rectangle and consists of first, second, ..., k-th, ..., and K-th input neuron units. It is therefore possible to understand that the input neuron units are arranged in a matrix fashion along rows and columns, the columns corresponding to the respective frames. The number of neuron units in each frame is equal to the first predetermined integer K. In the example being illustrated, the number of frames is equal to the second natural number J. In general, the number of frames should be sufficient to cover the first natural number I subjected to mapping.

As a result of arrangement in the matrix fashion, each input neuron unit is identifiable as a k-th row j-th column input neuron unit or an input neuron unit (k, j). The input neuron units of the j-th input layer frame or column will be designated by "input neuron units (j)" and are supplied with the j-th K-dimensional signal vector in the manner which will later be described more in detail.

Another of the three layers is an intermediate or hidden layer illustrated above the input layer. The intermediate layer comprises a plurality of intermediate neuron units. As described hereinabove, the intermediate neuron units are not connected to one another but are selectively connected to the input neuron units.

In FIG. 1, the intermediate neuron units are grouped into first, second, ..., j-th, ..., and J-th intermediate layer frames. Each frame consists of first, second, ..., m-th, ..., and M-th intermediate neuron units, where M represents a second predetermined integer which may be equal to a square root of the first predetermined integer K and is equal, for example, to four. The intermediate neuron units are therefore arranged, like the input neuron units, in a matrix fashion along first through M-th rows and first through J-th columns.

Each intermediate neuron unit is identifiable as an m-th row j-th column intermediate neuron unit or an intermediate neuron unit (m, j). The intermediate neuron units of the j-th column or frame will be represented by "intermediate neuron units (j)".

According to this invention, the intermediate neuron unit (m, j) is connected to the input neuron units of the j'-th input layer frames, where j' represents at least two consecutive integers which are equal to j and less than j. This manner of division into the input and the intermediate layer frames and connection between the input and the intermediate layers is herein called a time sequential structure or organization. In the manner described heretobefore, input to intermediate connections are used in so connecting the input neuron units to the intermediate neuron units.

In the example being illustrated, the intermediate neuron unit (m, j) is connected to the input neuron units (j) and (j - 1). In other words, the at least two consecutive integers are j and (j - 1). This manner of interconnection is symbollically depicted for the j-th intermediate layer frame by two lines drawn to the j-th and the (j-l)-th input layer frames.

It will readily be understood that no feature vectors are present at earlier pattern time instants which are earlier than the first pattern time instant. Even if included in the neural network for earlier signal time instants which are earlier than the first signal time instant, input neuron units (not shown) produce no signal components and contribute nothing to operation of the neural network. The time sequential structure is therefore applied to each of the intermediate neuron units (1)

although the intermidiate neuron unit (m, l) is connected only to the input neuron units (1). It is therefore possible to say as regards the time sequential structure that each intermediate neuron unit (m, j) is connected to none of the input neuron units of the input layer or frames when one of the at least two consecutive integers is either zero or a negative integer, namely, is not a positive integer.

A remaining one of the three layers is an output layer depicted at the top of the figure. The output layer comprises at least one output neuron unit. With numerals 1 through N encircled, first, second, ..., n-th, ..., and N-th output neuron units are exemplified, where N represents a third natural number. The output neuron units are preliminarily assigned to predetermined speech patterns which may presumably be represented by the input pattern time sequence.

In practice, the predetermined speech patterns are descriptors, such as a speech pattern identifier, indicative of results of recognition of various input pattern time sequences. The third natural number N is therefore equal to ten or a little greater when the neural network is used in recognizing spoken one-digit numerals. When only one output neuron unit is used, the neural network serves to recognize whether or not a particular speech pattern is represented by various input pattern time sequences. For recognition of various words, which may include either a part of a dictionary word or a concatenation of dictionary words, the third natural number N is equal to, for example, two hundred.

Each output neuron unit is connected to predetermined ones of the intermediate neuron units. In the illustrated example, each output neuron unit is connected to all intermediate neuron units. In other words, all intermediate neuron units are connected to each output neuron unit. Intermediate to output connections are used in so connecting the intermediate layer to the output layer. For the n-th output neuron unit alone, the intermediate to output connections are symbolically shown by lines starting at the first through the J-th intermediate layer frames. In the manner which will become clear as the description proceeds, the dynamic programming techniques are applicable to the neural network of the structure so far described. The neural network can therefore be called a dynamic neural network. Incidentally, the dynamic programming techniques are know in the art of pattern matching by an abbreviation "DP".

On describing operation of the dynamic neural network, the j-th K-dimensional signal vector will be represented by $\vec{x}(j)$ which consists of first, ..., k-th, ..., and K-th signal vector components $x(1, j), ..., x(k, j), ..., $ and $x(K, j)$ and will be defined by:

$$\vec{x}(j) = (x(1, j), \ldots, x(k, j), \ldots, x(K, j)).$$

The input signal time sequence is given by:

$$X = \vec{x}(1), \ldots, \vec{x}(j), \ldots, \vec{x}(J).$$

The input neuron unit (k, j) is supplied with the k-th component x(k, j) of the j-th signal vector. In the illustrated example, the input neuron unit (k, j) delivers the signal vector component x(k, j) to the intermediate neuron units (j) and (j -l) unless the input neuron unit under consideration is in the J-th input layer frame.

The intermediate neuron unit (m, j) is supplied with intermediate input components x(1, j) through x(K, j) and x(1, j - 1) through x(K, j - 1) from the input neuron units (j) and (j - 1). An intermediate weighting coefficient or factor u(k, m, j, O) is attributed to the input to intermediate connection which connects the input neuron unit (k, j) to the intermediate neuron unit (m, j). Another intermediate weighting coefficient u(k, m, j, 1) is attributed to the input to intermediate connection between the input neuron unit (k, j - 1) and the intermediate neuron unit (m, j). In the manner noted hereinabove, it is possible to understand that the intermediate neuron unit (m, j) has the weighting coefficients u(k, m, j, O) and u(k, m, j, 1) which should be multiplied on the intermediate input components delivered from the input neuron units (k, j) and (k, j - 1).

The intermediate neuron unit (m, j) calculates an intermediate weighted sum of the intermediate input components in accordance with the intermediate weighting coefficients for the respective intermediate input components and then nonlinearly transforms the weighted sum into an intermediate output component y(m, j). When designated by net(m, j) in connection with the intermediate neuron unit (m, j), the intermediate weighted sum is given by:

$$\text{net}(m, j) = \sum_k u(k, m, j, O) \times (k, j) + \sum_k u(k, m, j, 1) \times (k, j - 1).$$

The intermediate output component is given by:

$$y(m, j) = f(\text{net}(m, j)),$$

where f represents a sigmoid function described in the Lippmann article referred to hereinabove. The sigmoid function may be:

$$1/(1+\exp(-\text{net}(m, j) - \theta(m, j))),$$

where $\theta(m, j)$ represents an intermediate layer threshold value which is specific to the intermediate neuron unit (m, j) and is between zero and unity.

In the weighted sum for the intermediate neuron unit (m, j), the intermediate input components x(k, j) and x(k, j - 1) are vector components of K-dimensional intermediate input vectors $\vec{x}(j)$ and $\vec{x}(j - 1)$. It is possible to deal with the intermediate weighting coefficients u(k, m, j, O) similarly as K vector components of an intermediate weighting vector $\vec{u}(m, j, O)$. Likewise, the intermediate weighting coefficients $\vec{u}(k, m, j, 1)$ are K vector components of another intermediate weighting vector $\vec{u}(m, j, 1)$. By using a dot in representing a scalar product of two vectors, the intermediate output component is simply written as:

$$y(m, j) = h_{m,j}(\vec{u}(m, j, O) \cdot \vec{x}(j) + \vec{u}(m, j, 1) \cdot \vec{x}(j - 1)),$$

where $h_{m,j}$ represents the sigmoid function for the intermediate neuron unit (m, j).

An output weighting coefficient v(n, m, j) is attributed to the intermediate to output connection which connects the intermediate neuron unit (m, j) to the n-th output neuron unit to deliver the intermediate output component y(m, j) to the n-th output neuron unit. It is possible to understand that the n-th output neuron unit has the output weighting coefficient v(n, m, j) which should be multiplied on the intermediate output component y(m, j) supplied to the n-th output neuron unit as an output layer input component.

According to such output weighting coefficients, the n-th output neuron unit calculates an n-th output weighted sum of the output layer input components supplied from all intermediate neuron units. Subsequently, the n-th output neuron unit nonlinearly transforms the output weighted sum into an n-th output signal component z(n). When denoted by Net(n), the n-th output weighted sum is given by:

$$\text{Net}(n) = \sum_j \sum_m v(n, m, j) y(m, j). \tag{1}$$

The n-th output signal component is given by:

$$z(n) = F(\text{Net}(n)),$$

where F represents a sigmoid function of the type described above. That is, the sigmoid function F may be:

$$1/(1+\exp(-\text{Net}(n)-\Theta(n)),$$

where $\Theta(n)$ represents an output layer threshold value which is specific to the n-th output neuron unit and is similar to the intermediate layer threshold values.

In the weighted sum for the n-th output neuron unit, the output layer input components y(m, j) serve as M vector components of an output layer input vector $\vec{y}(j)$. It is possible to deal with the output weighting coefficients v(n, m, j) as M vector components of an output weighting vector $\vec{v}(n, j)$. When scalar products are used, the n-th output signal component becomes:

$$z(n) = H_n\left(\sum_j \vec{v}(j) \cdot \vec{y}(j)\right), \tag{2}$$

where $H_n$ represents the sigmoid function for the n-th output neuron unit.

It will be assumed for a short while that the input signal time sequence X represents a particular speech pattern representative of a particular word. Without loss of generality, it will be presumed that the n-th output neuron unit is preliminarily assigned to the particular word. That is, the n-th output signal component is used as a word identifier (n) for the particular word. In an output signal produced by the neural network in response to the input signal time sequence X, first through N-th output signal components have different intensities which depend primarily on the input signal time sequence X and the intermediate and the output weighting coefficients u and v (arguments omitted). A certain one of the output signal components has a maximum intensity to serve as a sole significant component of the output signal.

According to the back-propagation training algorithm mentioned herein before, random numbers are used at first as the intermediate and the output weighting coefficients u and v. If the n-th output signal component is the sole significant component, the neural network is already ready for recognition of the particular word. If the n-th output signal component is not the sole significant component, the back-propagation training algorithm is executed in the known manner to train the neural network by adjusting the output weighting coefficients v and the intermediate weighting coefficients u.

After repetition of training, the neural network eventually learns optimum intermediate and output weighting coefficients to produce the n-th output signal component as the sole significant component of the output signal when the input signal time sequence X represents the particular word. The n-th output signal component indicates the word identifier (n) as a correct result of recognition of various input signal time sequences X which represent the particular word.

It is now possible to understand that the neural network includes an adjusting arrangement for adjusting an entirety of the neural network to maximize the output signal, such as the n-th output signal component produced by the n-th output neuron unit. Inasmuch as adjustment of the entire neural network relates primarily to the intermediate and the output weighting coefficients u and v which are basically attributed to the input to intermediate and the intermediate to output connections, the adjusting arrangement is symbolically illustrated by arrows 11 and 12 which are depicted on the right-hand sides of the intermediate to output and the input to intermediate connections.

It is described before that a time sequential structure is used for the input and the intermediate layers of a neural network according to this invention. The time sequential structure is unexpectedly advantageous in making the neural network serve as a matching filter for use in extracting features or characteristics of a time sequential pattern, such as the phonemes of a speech pattern, locally from various parts of the time sequential pattern. Furthermore, the dynamic programming techniques are readily applicable to the neural network as pointed out above.

For the input pattern time sequence representative of an input speech pattern, the i-th K-dimensional feature vector $\vec{a}(i)$ consists of first, ..., k-th, ..., and K-th pattern vector components a(l, i), ..., a(k, i), ..., and a(k, i) as:

$$\vec{a}(i) = (a(l, i), \ldots, a(k, i), \ldots, a(K, i)).$$

The input pattern time sequence is given by:

$$A = \vec{a}(l), \ldots, \vec{a}(i), \ldots, \vec{a}(I).$$

It is known in the art of speech recognition that the features of a speech pattern have time sequential positions or instants which vary complicatedly along the input pattern time axis i depending on the speech pattern produced in various manners of utterance. In other words, the variations in the time sequential positions have a very intricate nonlinearity. More specifically, the i-th feature vector may represent a part of a phoneme in a speech pattern representative of a particular word and a part of another phoneme in another speech pattern representative of the particular word. One of these two speech patterns may be called a distorted pattern relative to the other. For the speech patterns, it will be said that the input pattern time axes are subjected to nonlinear distortion.

Admittedly, a conventional neural network is very flexible. The conventional neural network is, however, disadvantageous in speech recognition due to presence of such distorted patterns. It takes long time to train the conventional neural network in consideration of the distorted patterns. Use is necessary of a great number of input pattern time sequences which represent a particular speech pattern according to various nonlinearities. It is admittedly possible to shorten the time necessary for training if only a reduced number of input pattern time sequences are used. In this event, the particular speech pattern will not be correctly recognized if represented by an input pattern time sequence having a nonlinearity for which the neural network has not yet been trained. In marked contrast, the dynamic neural network can learn the input pattern time sequences which represent various speech patterns with widely different nonlinearities. For example, about forty times of training are sufficient in connection with each speech pattern to make the dynamic neural network correctly recognize the speech pattern in question.

In the manner described above, a mapping function:

$$j = j(i),$$

is used in mapping the input pattern time axis i to the input signal time axis j. For an input pattern time sequence A representative of a speech pattern in a certain manner, the mapping function is adjusted so that a correct result of recognition is obtained by the optimum intermediate and output weighting coefficients at one of the output neuron units that is preliminarily assigned to the speech pattern under consideration.

Let the speech pattern in question represent the particular word specified by the word identifier (n) described above. The mapping function is adjusted so that the n-th output signal component has the maximum intensity. This is achieved by maximizing the argument of the sigmoid function in Equation (2) because the sigmoid function always monotonously increases. In other words, the output weighted sum Net(n) should be maximized for the n-th output neuron unit.

When the i-th feature vector $\vec{a}(i)$ is substituted for the j-th signal vector $\vec{x}(j)$ in a vector summation corresponding to Equation (1) with attention directed to the mapping function, maximization of the output weighted sum Net(n) results in a problem of maximization of a vector summation given by:

$$\max_{j=j(i)} \sum_i \vec{v}(n, j) \times [h_{1,j} \overline{u}(1, j, 0) \cdot \vec{a}(i) + \overline{u}(1, j, 1) \cdot \vec{a}(i-1)) + \ldots + h_{M,j} (\overline{u}(M, j, 0) \cdot \vec{a}(i) + \overline{u}(M, j, 1) \cdot \vec{a}(i-1))]. \quad (3)$$

In this vector summation maximization problem, each summand of the summation is determined by a combination (n, i, j). The summand will therefore be represented by:

$$r(n, i, j) = \vec{v}(n, j) \times [h_{1,j} \overline{u}(1, j, 0) \cdot \vec{a}(i) + \overline{u}(1, j, 1) \cdot \vec{a}(i-1)) + \ldots + h_{M,j} (\overline{u}(M, j, 0) \cdot \vec{a}(i) + \overline{u}(M, j, 1) \cdot \vec{a}(i-1))]. \quad (4)$$

The vector summation maximization problem becomes:

$$\max_{j=j(i)} \sum_{i=1}^{I} r(n, i, j). \quad (4)$$

It is now understood that the input pattern time sequence A is supplied to the neural network as the input signal time sequence X so that a summation of the summands r(n, i, j) is maximized as regards the mapping function according to Formula (4). Maximization of Formula (4) removes the nonlinear distortion between the pattern and the signal time axes i and j.

The neural network therefore includes an input arrangement for supplying the input neuron units with a signal time sequence X representative of an input pattern, namely, with vector components, KI in number, of the feature vectors of the input pattern time sequence A. The input arrangement is symbolically illustrated in FIG. 1 by an arrow 13 which is depicted on the left-hand side between the input pattern time sequence A and the input signal time sequence X. In the manner which will be described in the following, the dynamic programming techniques are applicable to the input arrangement 13 and the adjusting arrangement depicted by the arrows 11 and 12.

A typical dynamic programming algorithm is as follows. For each of the output neuron units, use is made of a variable g(n, i, j) which is sometimes called a recurrence coefficient and is variable when the input pattern time instants i and the input signal time instants j are varied from unity to the first natural number I and to the second natural number J.

The initial condition is:

$$g(n, 1, 1) = r(n, 1, 1). \quad (5)$$

The recurrence formula is:

$$g(n, i, j) = r(n, i, j) + \max \begin{pmatrix} g(n, i-1, j) \\ g(n, i-1, j-1) \\ g(n, i-1, j-2) \end{pmatrix}. \quad (6)$$

The n-th output signal component is given by:

$$z(n) = g(n, I, J). \quad (7)$$

Figure 2:
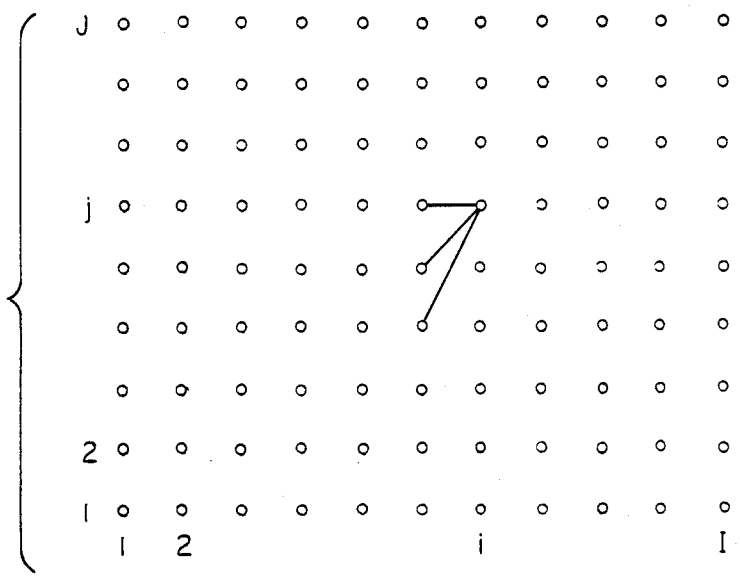
FIG. 2 is for use in describing operation of the neural network illustrated in FIG. 1.

Turning to FIG. 2, the first through the I-th input pattern time instants are depicted along the abscissa and the first through the J-th input signal time instants, along the ordinate. Merely for simplicity of illustration, it is assumed that the first and the second natural numbers I and J are equal to eleven and nine. Lattice or grid points (i, j) are determined by the input pattern and signal time instants i and j.

Equation or Formula (6) is calculated at selected ones of the lattice points in an ascending order. Including a zero increment, three increments 0, 1, and 2 are allowed as three degrees of freedom between the input pattern and signal time axes i and j. In other words, the input arrangement 13 supplies the first through the K-th vector components of each feature vector $\vec{a}(i)$ to the first through the K-th input neuron units of one of the j-th, the (j-1)-th, and the (j-2)-th input layer frames, respectively.

The zero increment means use of the j-th signal time instant twice and a stay of the i-th pattern time instant on the input signal time axis j. The increment 2 means a jump of the i-th pattern time instant from the (j-2)-th signal time instant to the j-th signal time instant. The three-degree freedom may therefore be called a correspondence which the input pattern time axis i has relative to the input signal time axis j with a stay and a jump allowed.

Figure 3:
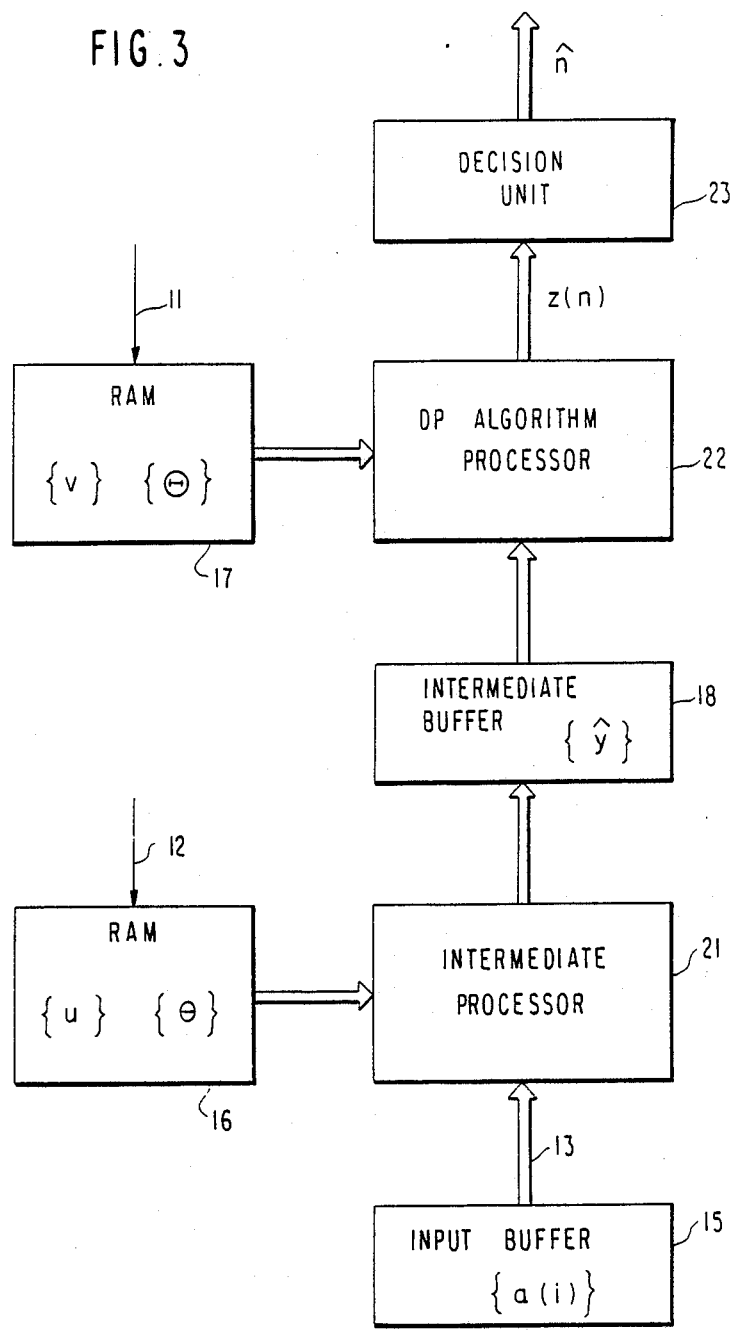
FIG. 3 is a block diagram of a neural network according to a second embodiment of this invention.

FIG. 3 illustrates, a neural network which is a practical embodiment of the neural network illustrated with reference to FIG. 1. It is possible to understand that the neural network is according to a second embodiment of this invention. The neural network is implemented primarily by a microprocessor. It will be surmised that memories are not included in the microprocessor.

An input buffer memory 15 is for memorizing the input pattern time sequence A. A first random access memory (RAM) 16 is for memorizing the intermediate weighting coefficients u and the intermediate layer threshold values $\theta(m, j)$ specific to the respective intermediate neuron units. A second random access memory 17 is for memorizing the output weighting coefficients v and the output layer threshold values $\Theta(n)$ specific to the respective output neuron units. An intermediate buffer memory 18 is for memorizing intermediate output components $\hat{y}(i, j, m)$ which will presently be described. The adjusting arrangement is symbolically indicated by arrows 11 and 12 drawn to the second and the first random access memories 17 and 16. The input arrangement 13 is indicated by a double-line connection drawn out of the input buffer memory 15.

The microprocessor comprises an intermediate processor 21, a dynamic programming algorithm processor 22, and a decision unit 23. It is possible to understand that the intermediate processor 21, the dynamic programming algorithm processor 22, and the decision unit 23 are implemented by first through third microprocessors which are either three parts of a single microprocessor or three individual microprocessors.

The intermediate processor 21 corresponds to a combination of the input and the intermediate neuron units described in conjunction with FIG. 1 and is operable as soon as the feature vectors of an input pattern are stored in the input buffer memory 15 up to a number which is necessary in the known manner to execute the dynamic programming algorithm. Using the feature vectors supplied as the signal vectors with a stay and a jump allowed and referring to the first random access memory 16, the intermediate processor 21 calculates the intermediate output components $\hat{y}$ (argemunts omitted) as follows.

$$\hat{y}(i, j, m) = h_{m,j}(\vec{u}(m, j, 0) \cdot \vec{a}(i) + \vec{u}(m, j, l) \cdot \vec{a}(i - l)).$$

It will be understood when reference is made to the maximization problem defined by Formula (3) that the intermediate output component $\hat{y}$ is an intermediate output component which is produced by the j-th frame intermediate neuron units (j) when the i-th feature vector $\vec{a}(i)$ is supplied to the input neuron units (j) and furthermore when the (i-1)-th feature vector $\vec{a}(i-1)$ is supplied to the input neuron units (j-1). With respect to the feature vectors of a necessary number which enables operation of the dynamic programming algorithm processor 22, the intermediate output component $\hat{y}$ are calculated and stored in the intermediate buffer memory 18. The necessary number depends on an adjustment window known in the dynamic programming techniques.

The dynamic programming algorithm processor 22 corresponds to the output layer of FIG. 1 and is operable as soon as the intermediate output components $\hat{y}$ are stored in the intermediate buffer memory 18 up to the necessary number. Using the intermediate output components $\hat{y}$ and referring to the second random access memory 17, the dynamic programming algorithm processor 22 executes the dynamic programming algorithm according to Equations (5) through (7). In Equation (6), r(n, i, j) is calculated as follows.

$$r(n, i, j) = \vec{v}(n, j) \cdot \vec{y}(i, j),$$

where $\vec{y}(i, j)$ represents an M-dimensional vector which consists of vector components $\hat{y}(i, j, 1), \ldots, \hat{y}(i, j, m), \ldots, \hat{y}(i, j, M)$. Iterative calculation of Formula (6) ends when $g(n, I, J)$ is obtained. Inasmuch as the sigmoid function monotonously increases, it is possible to make the dynamic programming algorithm processor 22 produce the n-th output signal component in accordance with:

$$z(n) = g(n, I, J) - \Theta(n). \tag{8}$$

with the sigmoid function neglected in Equation (7).

The decision unit 23 compares, with one another, the output signal components calculated according to Equation (8) for the first through the N-th output neuron units. A maximum one of the output signal components indicates a result $\hat{n}$ of recognition of the input pattern being dealt with and is delivered to a utilization device (not shown), such as an input device of an electronic digital computer system.

Again referring to FIGS. 1 and 3, the description will proceed to a neural network according to a third embodiment of this invention. Only the input arrangement 13 is different from that described above. More particularly, the mapping function is defined by:

$$i = i(j).$$

Equation (3) therefore becomes:

$$\max_{i=i(j)} \sum_j \vec{v}(n, j) \cdot \vec{y}(i, j),$$

with the vector components $\hat{y}(i, j, m)$ used in Equation (3). The typical dynamic programming algorithm is applicable when Formula (6) is rewritten into:

$$g(n, i, j) = r(n, i, j) + \max \begin{pmatrix} g(n, i, & j-1) \\ g(n, i-1, & j-1) \\ g(n, i-2, & j-1) \end{pmatrix}. \tag{9}$$

Figure 4:
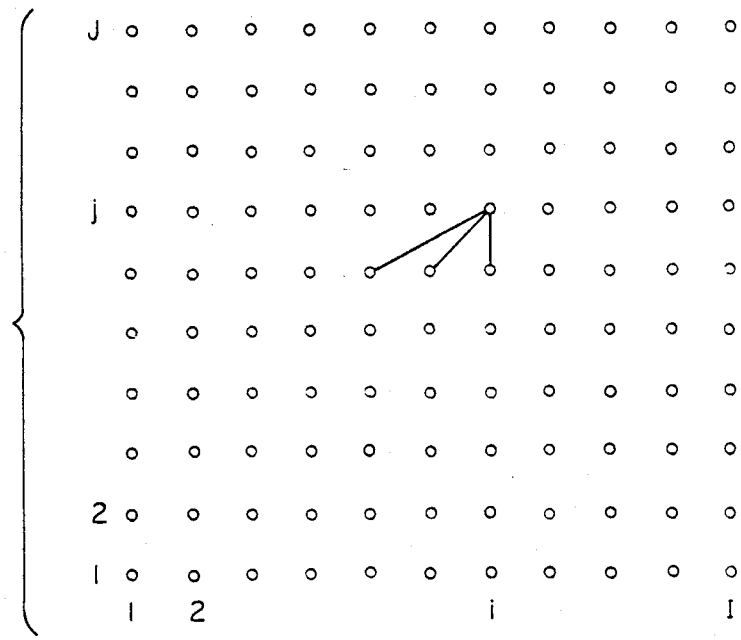
FIG. 4 is for use in describing operation of a neural network according to a third embodiment of this invention.

Referring to FIG. 4, the input pattern and signal time axes i and j are depicted like in FIG. 2. Formula (9) is calculated at selected ones of the lattice points (i, j) according to an ascending order. The increments 0, 1, and 2 are allowed as three degrees of freedom between the pattern and the signal time axes i and j.

In the manner described with reference to FIG. 2, the input arrangement 13 supplies the first through the K-th input neuron units of each input layer frame with the first through the K-th vector components of one of the i-th, the (i-1)-th, and the (i-2)-th feature vectors $\vec{a}(i)$, $\vec{a}(i-1)$, and $\vec{a}(i-2)$, respectively. It is possible to say that the three-degree freedom is a correspondence which the input signal time axis j has relative to the input pattern time axis i with a stay and a jump allowed.

While this invention has thus far been described in specific conjunction with a few preferred embodiments thereof, it will now be readily possible for one skilled in the art to carry this invention into effect in various other manners. For example, the intermediate processor 21 is readily implemented, rather than by a microprocessor or a part of a microprocessor, by a distributed processor of the type described as the intermediate neuron units in connection with FIG. 1. In particular, it should be noted that various dynamic programming techniques are known in the art of speech recognition and that any one of the dynamic programming techniques is applicable to the dynamic neural network. For instance, the dynamic neural network is operable according to an algorithm disclosed by Cory S. Meyers et al in the IEEE Transactions on Acoustics, Speech, and Signal Processing, Volume ASSP-29, Nov. 2 (April 1983), pages 284 to 297, under the title of "A Level Building Dynamic Time Warping Algorithm for Connected Word Recognition".

What is claimed is:

1. A neural network for recognizing an input pattern represented by a pattern time sequence of feature vectors which are positioned at respective pattern time instants, said neural network comprising:

an input layer of input neuron units grouped into first through J-th input layer frames, where J represents a predetermined natural number;

an intermediate layer of intermediate neuron units grouped into first through J-th intermediate layer frames;

an output layer comprising an output neuron unit assigned to a predetermined pattern;

input-intermediate connections connecting each intermediate neuron unit of a j-th intermediate layer frame to the input neuron units of at least two consecutive input layer frames beginning at the j-th input layer frame and proceeding in a descending order in the direction of (j-1), where j is variable between 1 and J, both inclusive, said input-intermediate connections connecting each intermediate neuron unit of said j-th intermediate layer frame to no input neuron unit when (j-1) is not a positive integer;

intermediate-output connections connecting said output neuron unit to the intermediate neuron units of said first through said J-th intermediate layer frames;

input means for supplying said feature vectors to the input neuron units of said first through said J-th input layer frames with correspondence established between said pattern time instants and said first through said J-th input layer frames; and adjusting means connected to said input-intermediate and said intermediate-output connections for adjusting said input-intermediate and said intermediate-output connections to make said output neuron unit produce an output signal, said neural network recognizing said input pattern as said predetermined pattern when said adjusting means maximizes said output signal.

2. A neural network for recognizing an input pattern represented by a pattern time sequence of feature vectors which are positioned at respective pattern time instants, said neural network comprising:

an input layer of input neuron units grouped into first through J-th input layer frames, where J represents a predetermined natural number;

an intermediate layer of intermediate neuron units grouped into first through J-th intermediate layer frames;

an output layer comprising output neuron units assigned to respective predetermined patterns;

input-intermediate connections connecting each intermediate neuron unit of a j-th intermediate layer frame to the input neuron units of at least two consecutive input layer frames beginning at the j-th input layer frame and proceeding in a descending order in the direction of (j-1), where j is variable between 1 and J, both inclusive, said input-intermediate connections connecting each intermediate neuron unit of said j-th intermediate layer frame to no input neuron unit when (j-1) is not a positive integer;

intermediate-output connections connecting each output neuron unit to the intermediate neuron units of said first through said J-th intermediate layer frames;

input means for supplying said feature vectors to the input neuron units of said first through said J-th input layer frames with correspondence established between said pattern time instants and said first through said J-th input layer frames; and adjusting means connected to said input-intermediate and said intermediate-output connections for adjusting said input-intermediate and said intermediate-output connections to make said output neuron units produce respective output signal components with one of said output neuron units made to maximize its output signal component, said neural network recognizing said input pattern as one of said predetermined patterns that is assigned to said one of the output neuron units.

3. A neural network for recognizing an input pattern represented by a pattern time sequence of feature vectors which are positioned at respective pattern time instants, each of said feature vectors consisting of first through K-th vector components, where K represents a first predetermined positive integer, said neural network comprising:

an input layer of input neuron units grouped into first through J-th input layer frames, where J represents a predetermined natural number;

an intermediate layer of intermediate neuron units grouped into first through J-th intermediate layer frames;

an output layer comprising output neuron units assigned to respective predetermined patterns;

input-intermediate connections connecting each intermediate neuron unit of a j-th intermediate layer frame to the input neuron units of at least two consecutive input layer frames beginning at the j-th input layer frame and proceeding in a descending order in the direction of (j-1), where j is variable between 1 and J, both inclusive, said input-intermediate connections connecting each intermediate neuron unit of said j-th intermediate layer frame to no input neuron unit when (j-1) is not a positive integer;

intermediate-output connections connecting each output neuron unit to the intermediate neuron units of said first through said J-th intermediate layer frames;

input means for supplying said feature vectors to the input neuron units of said first through said J-th input layer frames with correspondence established between said pattern time instants and said first through said J-th input layer frames; and adjusting means connected to said input-intermediate and said intermediate-output connections for adjusting said input-intermediate and said intermediate-output connections to make said output neuron units produce respective output signal components with one of said output neuron units made to maximize its output signal component, said neural network recognizing said input pattern as one of said predetermined patterns that is assigned to said one of the output neuron units;

wherein each of said first through said J-th input layer frames consists of first through K-th input neuron units, each of said first through said J-th intermediate layer frames consisting of first through M-th intermediate neuron units, where M represents a second predetermined positive integer which is less than said first predetermined positive integer;

said input means supplying the first through the k-th vector components of each feature vector to the first through the K-th input neuron units of one of said first through said J-th input layer frames, respectively, with said correspondence established by selecting one of the first through the J-th input layer frames from three input layer frames consisting of the j-th, the (j-1)-th, and the (j-2)-th input layer frames, said one of the first through the J-th input layer frames being said first input layer frame when one of (j-1) and (j-2) is not a positive integer.

4. A neural network for recognizing an input pattern represented by a pattern time sequence of feature vectors which are positioned at respective pattern time instants, each feature vector being first through I-th feature vectors, where I represents a positive integer dependent on said input pattern, each of said first through said I-th feature vectors consisting of first through K-th vector components, where K represents a first predetermined positive integer, said neural network comprising:

an input layer of input neuron units grouped into first through J-th input layer frames, where J represents a predetermined natural number;

an intermediate layer of intermediate neuron units grouped into first through J-th intermediate layer frames;

an output layer comprising output neuron units assigned to respective predetermined patterns;

input-intermediate connections connecting each intermediate neuron unit of a j-th intermediate layer frame to the input neuron units of at least two consecutive input layer frames beginning at the j-th input layer frame and proceeding in a descending order in the direction of (j-1), where j is variable between 1 and J, both inclusive, said input-intermediate connections connecting each intermediate neuron unit of said j-th intermediate layer frame to no input neuron unit when (j-1) is not a positive integer;

intermediate-output connections connecting each output neuron unit to the intermediate neuron units of said first through said J-th intermediate layer frames;

input means for supplying said feature vectors to the input neuron units of said first through said J-th input layer frames with correspondence established between said pattern time instants and said first through said J-th input layer frames; and adjusting means connected to said input-intermediate and said intermediate-output connections for adjusting said input-intermediate and said intermediate-output connections to make said output neuron units produce respective output signal components with one of said output neuron units made to maximize its output signal component, said neural network recognizing said input pattern as one of said predetermined patterns that is assigned to said one of the output neuron units;

wherein each of said first through said J-th input layer frames consists of first through K-th input neuron units, each of said first through said J-th intermediate layer frames consisting of first through M-th intermediate neuron units, where M represents a second predetermined positive integer which is less than said first predetermined positive integer;

said input means supplying the first through the K-th input neuron units of each input layer frame with the first through the K-th vector components of one of said first through said I-th feature vectors, respectively, with said correspondence established by selecting said one of the first through the I-th feature vectors from three feature vectors consisting of an i-th, and (i-1)-th, and an (i-2)-th feature vector, where i is variable between 1 and I, both inclusive, said one of the first through the I-th feature vectors being said first feature vector when one of (i-1) and (i-2) is not a positive integer.

* * * * *

UNITED STATES PATENT AND TRADEMARK OFFICE
CERTIFICATE OF CORRECTION

PATENT NO. : 4,975,961
DATED : December 4, 1990
INVENTOR(S) : Hiroaki SAKOE

It is certified that error appears in the above-identified patent and that said Letters Patent is hereby corrected as shown below:

Col. 7, line 20, delete "Θ" and insert --Ⓗ--;

Col. 7, line 22, delete "θ" and insert --Ⓗ--;

Col. 11, line 15, delete "θ" and insert --Ⓗ--;

Col. 12, line 5, delete "v" and insert --$\vec{v}$--;

Col. 12, line 5, delete "y" and insert --$\vec{\hat{y}}$--;

Col. 12, line 7, delete "$\vec{y}$" and insert --$\vec{\hat{y}}$--;

Col. 12, line 8, delete "y" and insert --$\hat{y}$--;

Col. 12, line 10, delete "$\hat{g}$" and insert --g--;

Col. 12, line 16, delete "θ" and insert --Ⓗ--;

Col. 12, line 38, delete "v" and insert --$\vec{v}$--;

Col. 12, line 38, delete "y" and insert --$\vec{\hat{y}}$--.

Signed and Sealed this

Twenty-second Day of September, 1992

Attest:

DOUGLAS B. COMER

Attesting Officer     Acting Commissioner of Patents and Trademarks